April 7, 1970 P. L. V. BREANT 3,505,644

METHODS OF CONDITIONING BINARY INFORMATION SIGNALS FOR TRANSMISSION

Filed Sept. 16, 1966 5 Sheets-Sheet 1

INVENTOR.
PIERRE L.V. BREANT

BY

AGENT

INVENTOR.
PIERRE L.V. BREANT
BY
Frank R. Trifari
AGENT

April 7, 1970 P. L. V. BREANT 3,505,644

METHODS OF CONDITIONING BINARY INFORMATION SIGNALS FOR TRANSMISSION

Filed Sept. 16, 1966 5 Sheets-Sheet 3

INVENTOR.
PIERRE L. V. BREANT

BY

AGENT

April 7, 1970 P. L. V. BREANT 3,505,644

METHODS OF CONDITIONING BINARY INFORMATION SIGNALS FOR TRANSMISSION

Filed Sept. 16, 1966 5 Sheets-Sheet 4

INVENTOR.
PIERRE L.V. BREANT
BY
Frank R. Trifari
AGENT

INVENTOR.
PIERRE L.V. BREANT
BY
AGENT

United States Patent Office 3,505,644
Patented Apr. 7, 1970

3,505,644
METHODS OF CONDITIONING BINARY INFORMATION SIGNALS FOR TRANSMISSION

Pierre Louis Vincent Breant, Clamart, France, assignor to Telecommunications Radioelectriques et Telephoniques T.R.T., Paris, France Filed Sept. 16, 1966, Ser. No. 580,108
Claims priority, application France, Sept. 20, 1965, 31,988
Int. Cl. G08c 25/00
U.S. Cl. 340—146.1 8 Claims

ABSTRACT OF THE DISCLOSURE

An apparatus for converting binary to trivalent signals which does not require any memory at a transmitter. The binary zeros are always converted into trinary zeros. Sequential elements of binary ones are converted into trinary ones or minus ones. The polarity being the same for every other group. The polarity does not alternate when the number of intervening zeros is even and the parity of the last element of the preceding group of binary ones is of a selected kind. This kind can be selected as even or odd. The binary waveform can be inverted.

The present invention relates to the transmission of binary information signals, by wire or radio, which information is represented in practice by the presence of an electric pulse, indicated by 1, or the absence of an electric pulse, indicated by 0, at regularly consecutive instants of a frequency $2s$ wherein $s$ is a frequency measured in Hz.

By substituting for such a so-called bivalent modulation—the electric signal can assume only two discrete values—a trivalent modulation (+1, 0, −1), correctly related to the former, the bandwidth required for transmitting the information with a given telegraphic distortion, is practically divided by two with equal transmission reliability, as described in French patent specification 1,330,777 of May 7, 1962 in the name of the applicant.

This patent describes a particular embodiment of said method, in which the groups of 1 of the bivalent modulation are alternately represented by groups of +1 and groups of −1 in the trivalent modulation.

It is also known that, by filtering the aforesaid trivalent modulation by means of a filter satisfying the Nyquist condition for the frequency $s=1/2T$, a signal is obtained, which is zero at times defined by the formula $t_0+nT$ wherein $t_0$ is a given instant and $n$ is an integer. This method is used in said French patent specification and by a synchronous demodulation it permits of extracting at the receiver end the information transmitted with minimum uncertainty.

As described in said patent specification it is possible to transmit on the same carrier frequency two independent channels by amplitude modulation with two sidebands, if at the transmitter end two carriers in quadrature and a synchronous demodulation at the receiver end are employed. This requires the transmission of a phase reference signal in order to obtain a synchronous demodulation: since the carrier cannot be used for this purpose; French patent specification 1,381,314 of Aug. 23, 1963, also in the name of the applicant, uses for this purpose the transmission of two spaced pilot signals differing by $1/2T$ from the carrier frequency, which permits by simple intermodulation of the two pilot signals to reconstitute at the receiver end simultaneously the demodulated carrier and the clock signal required for synchronous recovery of the signal emitted by the data source, independently of the changes of the frequency of the carrier source or of the transmission path.

The beat signal of these pilot signals does not disturb the operation of the data transmission paths, if it is zero at the instants chosen for the demodulation of the data on one of the paths. On the other hand the positions of the zero's of this beat signal is disturbed by the modulation representing the data to be transmitted, if the latter comprises a component of the frequency $1/2T$.

The present invention has for its object to provide a method of conditioning binary information for transmission, which method permits of avoiding said disturbance by using a trivalent modulation not having a component of the frequency $1/2T$.

This method, in which element by element for a time-sequence of elements which may assume two values 0 and 1 and represent the information to be transmitted, is substituted another time-sequence, the elements of which may assume three different values −1, 0 and 1, an element 0 being substituted for any element 0, a group of either +1-elements or −1-elements being substituted for any group of elements 1. The groups are termed elements 1 and sequences of 1-elements without the interposition of 0-elements, when these 1-elements and these sequences are immediately preceded and followed by a 0-element. The polarity of the two groups substituted for two consecutive groups of 1-elements being, in general, inverse, is mainly characterized in that said polarities are not inverse when and only when simultaneously on the one hand the number of 0-elements separating said two consecutive groups is even, and on the other hand all the 1-elements being arranged in their order of succession, the order of the last element 1 of the first of the said two consecutive groups has a certain parity.

The method according to the invention is the sole method which permits of preserving a high number of polarity inversions without introducing into the modulation components of the frequency $1/2T$ and without requiring a "prediction" in taking a decision for the inversion of the initial modulation, which means storing this modulation and delaying the transmission. This method ensures furthermore a certain concentration of the energy transmitted in the low frequencies.

With reference to FIGS. 1 to 7 the following describes a specific embodiment of the method of conditioning binary information for transmission according to the invention. The embodiments to be described hereinafter have to be considered as forming part of the invention, it being understood that any equivalent variant may likewise fall within the scope of this invention.

The figures only show the elements necessary for a good understanding of the invention, while the corresponding elements of these figures are designated by the same reference numerals.

In FIG. 6 the zero level is indicated by a full line at the side of the diagram.

Figure 1:
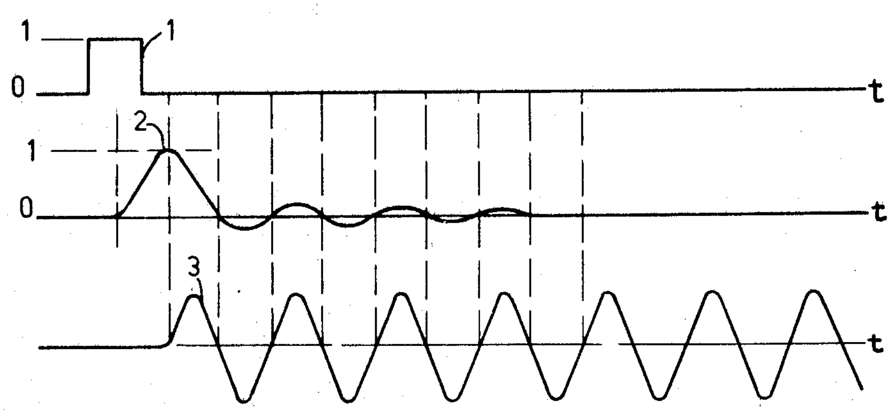
FIG. 1 illustrates an elementary pulse as a function of time, plotted on the abscissa.

It will first be shown that the modulation obtained according to the invention does not comprise spectral components of the frequency $1/2T$: it being assumed that a trivalent modulation is filtered by a filter satisfying the Nyquist condition around the frequency $1/2\ T$. An isolated element +1 or −1, represented on the upper line of FIG. 1, provides a residual signal 2 of an attenuated sinusoidal waveform of a period 2T. When instead of an isolated element +1 or −1 a modulation of several elements appears, this gives rise to a total residual signal resulting from the superimposition of the elementary residual signals such as 2.

If the attenuation is neglected, the isolated elements provides an imaginary residual signal 3. If the code of substitution applied is such that the imaginary residual signal of any modulation retains always a finite amplitude, the spectral density of energy of a modulation resulting from a random bivalent modulation will be zero. It is then possible to take an instant at which during a 0-element the total imaginary residual signal is zero. From this instant any group of 1-elements of even number (length 0 modulo 2) gives rise to an imaginary residual signal 0, while any group of 1-elements of odd number (length 1 modulo 2) gives rise to the same imaginary residual signal as its first element. In other words, from the instant when the imaginary residual signal is zero during a group of 0-elements, it is possible to choose in an arbitrary manner the polarity of the group of 1-elements which follows, without the risk of increasing the amplitude of the imaginary residual signal; in particular, it is possible to invert the polarity with respect to that of the preceding group of 1-elements.

This situation changes only when a group of 1-elements of length 1 modulo 2 is encountered. At this instant a residual signal not equal to zero appears and the polarity of the next group of 1-elements can no longer be chosen arbitrarily.

Then this polarity is chosen so that the imaginary residual signal with respect to the first element of this group is in phase opposition to the total imaginary residual signal of the preceding modulation. This choice depends apparently upon the length (modulo 2) of the group of 0's: if this length is equal to 1, the inversion has to be carried out; if this length is 0, this does not have to be done, so that the imaginary residual signal after this new group of 1's is zero, when this group has a length equal to 1 (modulo 2) or equal to the preceding imaginary residual signal, if this group has a length equal to 0 (modulo 2). In the latter case the situation is maintained as long as only groups of 1's of length 0 (modulo 2) appear, whereas it is not changed until a group of length 1 is encountered, in which case the initial situation is restored.

It will be apparent that, when this is continued, the amplitude of the total imaginary residual signal can only be zero or be equal to a given value. Since the imaginary residual signal does not change its amplitude until a group of 1-elements of length 1 (modulo 2) has appeared, it may be said that it changes its amplitude only when, the elements 1 being enumerated in their order of succesion in time, the order modulo 2, that is to say, the parity of the last element of the last group of 1's has a value differing from that which corresponds to the last element of the preceding group. It being assumed that the imaginary residual signal of a modulation is zero after an element of the order 0 (or 1) (modulo 2), it will be seen that the process followed comes down to the systematic inversion of polarity of the groups of 1-elements with the exception of the situation after an element 1 of the order 1 (or 0) (modulo 2), followed by an even number of 0-elements: this is the principle decribed above.

The foregoing shows that the substitution employed introduces a minimum of imaginary residual signal without the necessity of predicting the "future," that is to say practically, of setting the initial modulation in store during a given time before the transmission.

Figure 2:
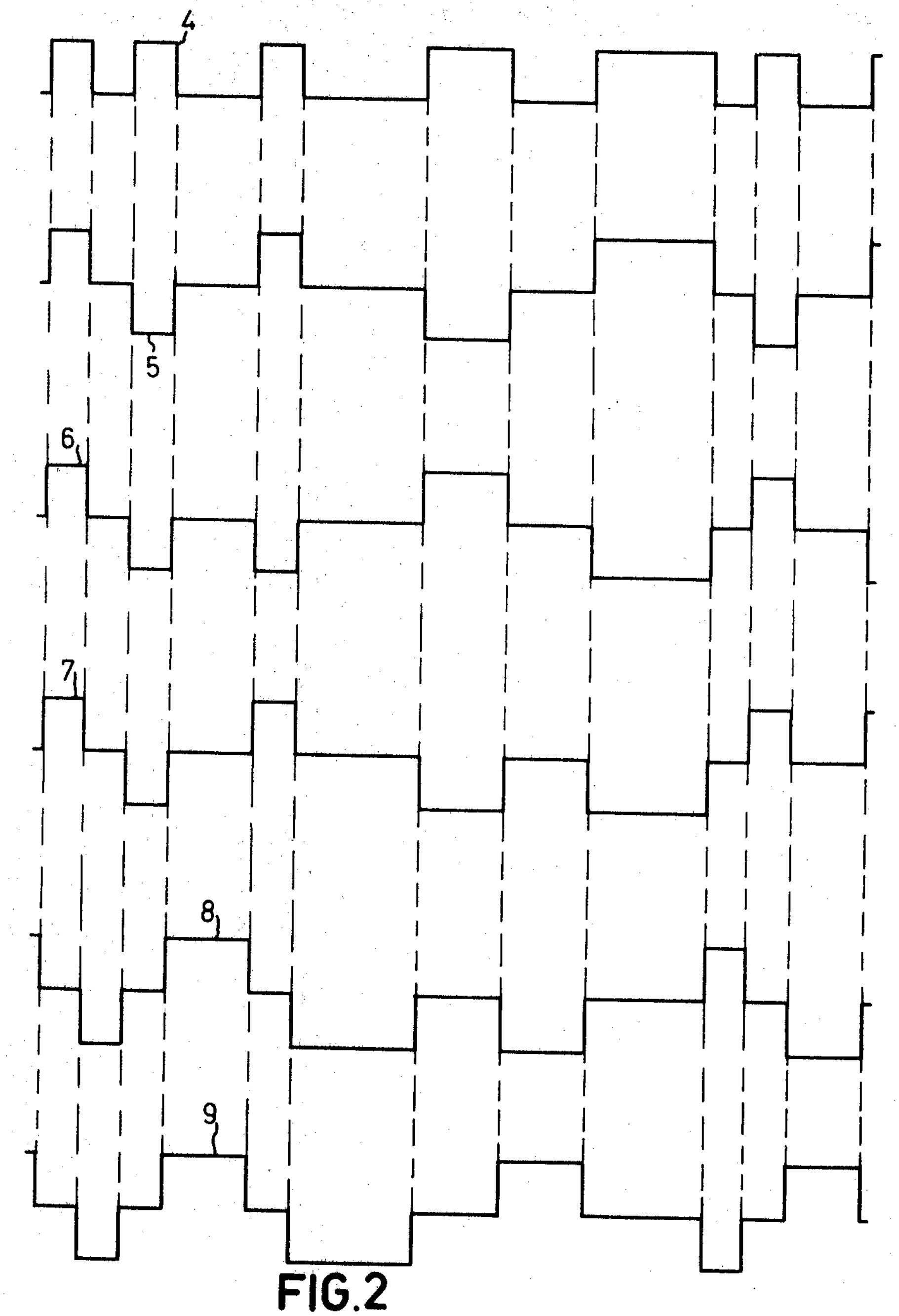
FIG. 2 illustrates likewise various trivalent sequences that can replace a bivalent sequence.

FIG. 2 illustrates the substitution according to the invention. The signal 4 constitutes the modulation or the sequence of initial signals and represents the binary information 10100100001100111101001. The signal 5 results from a substitution, in which the polarities of two groups replacing two consecutive groups of 1-elements are always inverse according to the aforesaid French patent specifications. The signals 6 and 7 result from two substitutions according to the invention, the inversion being still performed with the exception of the case in which simultaneously the number of 0-elements separating the two consecutive groups of 1-elements is even and the order of the last 1-element of the first of these two groups is even (signal 6) or odd (signal 7). The signals 8 and 9 result from two further substitutions according to the invention. They are obtained like the signals 6 and 7, but the role of the 0- and 1-elements of the initial modulation 4 is inverted: the element 1 (as indicated in the figure) is then termed the 0-element and conversely.

In the following embodiments of the invention will be described:

(a) The code converter to be interposed between the bivalent initial modulation and the trivalent modulation, (b) The device for recovering the bivalent modulation at the receiver end. This device may comprise error-detectors within the scope of the invention.

No reference is made to filtering devices, to equalizing devices, to carrier modulation and to pilot signal injection at the transmitter end, to demodulation and to the extraction of the clock pulses and of the carrier frequency at the receiver end, which are identical with those of the devices described in the aforesaid patent specifications (it should be noted that the transmission of the same bivalent modulation may be performed through a single channel alternatively or through the two channels with the aid of a divide-by-two circuit).

Figure 3:
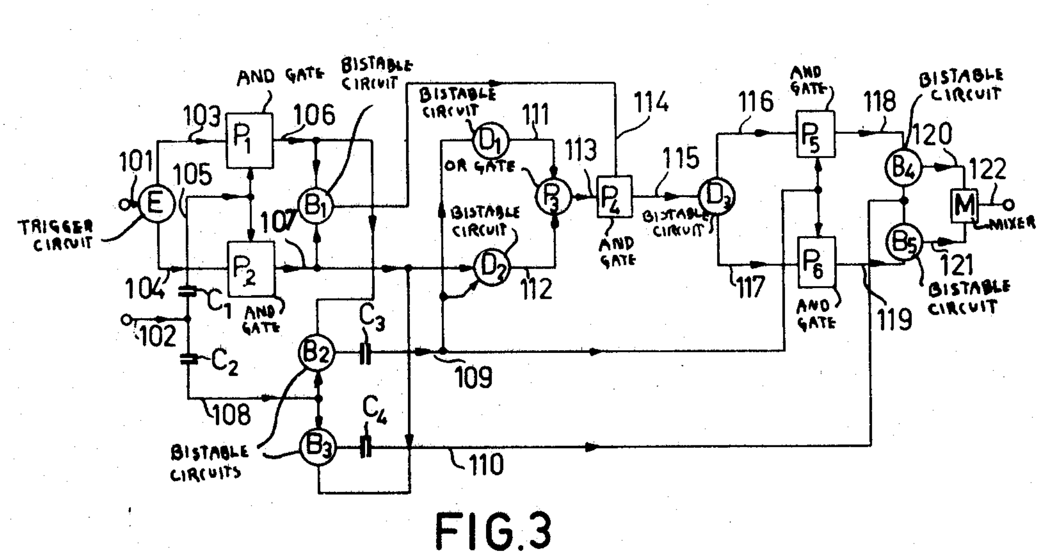
FIGS. 3 and 5 illustrate the diagrams of two signal converters according to the invention.

FIG. 3 shows the basic diagram of a first embodiment of the converter for the bivalent signals into trivalent signals according to the invention. In this figure E designates the input circuit (for example Schmidt trigger), P1, P2, P4, P5, P6 designate "And" gates, B1 to B5 bistable triggers (Eccles-Jordan), D1 to D3 demultipliers, that is to say, bistable circuits changing their state at each incoming pulse, C1 to C4 differentiation capacitors, P3 designates an "Or"-gate, M an output mixing circuit. The references 101 to 122 permit of retracing in FIG. 4 the signals prevailing across the various conductors. The arrows indicate the sense of propagation of the signals. The members not having a logic function have been omitted.

Figure 4:
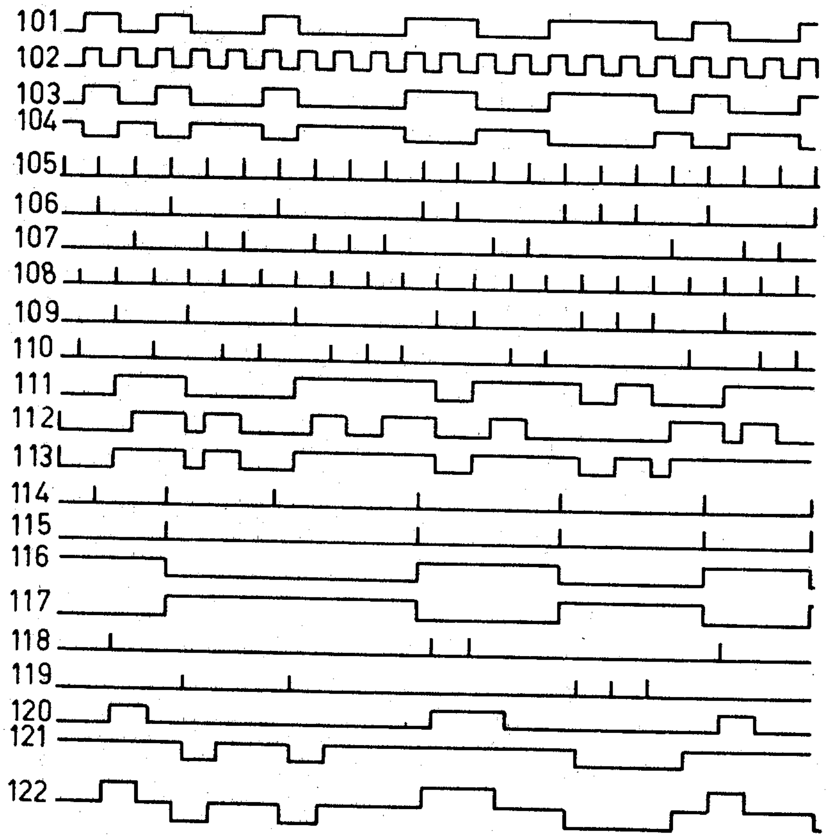
FIGS. 4 and 6 illustrate, as a function of time plotted on the abscissa, the electric signals appearing at various points of the converters of FIGS. 3 and 5 respectively.

FIG. 4 shows diagrammatically the signals prevailing across the various circuits for the initial bivalent modulation and the substitution already illustrated in FIG. 2. The signal 101 corresponds with the signal 4 of FIG. 2 and the signal 122 with the signal 6.

The operation is as follows. The initial bivalent modulation 101 having a rate $1/T$ and the clock signal 102 (square-wave signal of a period T) are applied to the indicated conductors. The bivalent input modulation is transformed into two complementary modulations 103 and 104 in the circuit E. These two modulations are transformed into trains of pulses 106 (elements 1) and 107 (elements 0), synchronized to the clock signal by the gates P1 and P2, also receiving the pulses 105, derived from the block signal through the capacitor C1.

The groups of pulses 106 are reduced to their first pulse by the trigger B1, which is set into its operative state by these pulses and, as long as it is not set to the rest position by a pulse 107, it remains therein. Only the change-over from the rest position to the operative state is transmitted to the members following this trigger. The pulses 106 and 107 are, on the other hand, delayed by $T/2$ (signals 109 and 110, obtained across the capacitors C3 and C4) by the triggers B2 and B3, to which they are applied respectively and which are set to the rest state by the pulses 108, derived through the capacitor C2 from the other flank of the clock signal. The pulses 109, applied in the demultiplier D1 determines the parity (signal 111) of the order of the 1-elements of the initial modulation. The pulses 107, applied to the demultiplier D2, which is on the other hand set to zero by the pulses 109, determines the length modulo 2 (signal 112) of the groups of 0-elements (it is assumed here that the lower voltage of D1 and D2 corresponds to zero). The gate P3 combining the indications of D1 and D2, determines (signal 113) whether the inversion of polarity has to be performed. The gate P4 permits of transferring the result of the calculation with the aid of the pulses 114 from the trigger B1 to the demultiplier D3 (signal 115), which selects the polarity of the next group of 1's to be transmitted (signals 116 and 117) by injecting through the gates P5 and P6 the pulses 109 into the triggers B4 or B5. These triggers are reset to zero by the pulses 110. The output signals 120 and 121 of opposite polarity are mixed by a circuit M and provide the trivalent signals 122, obtained at the output.

Figures 5, 7:
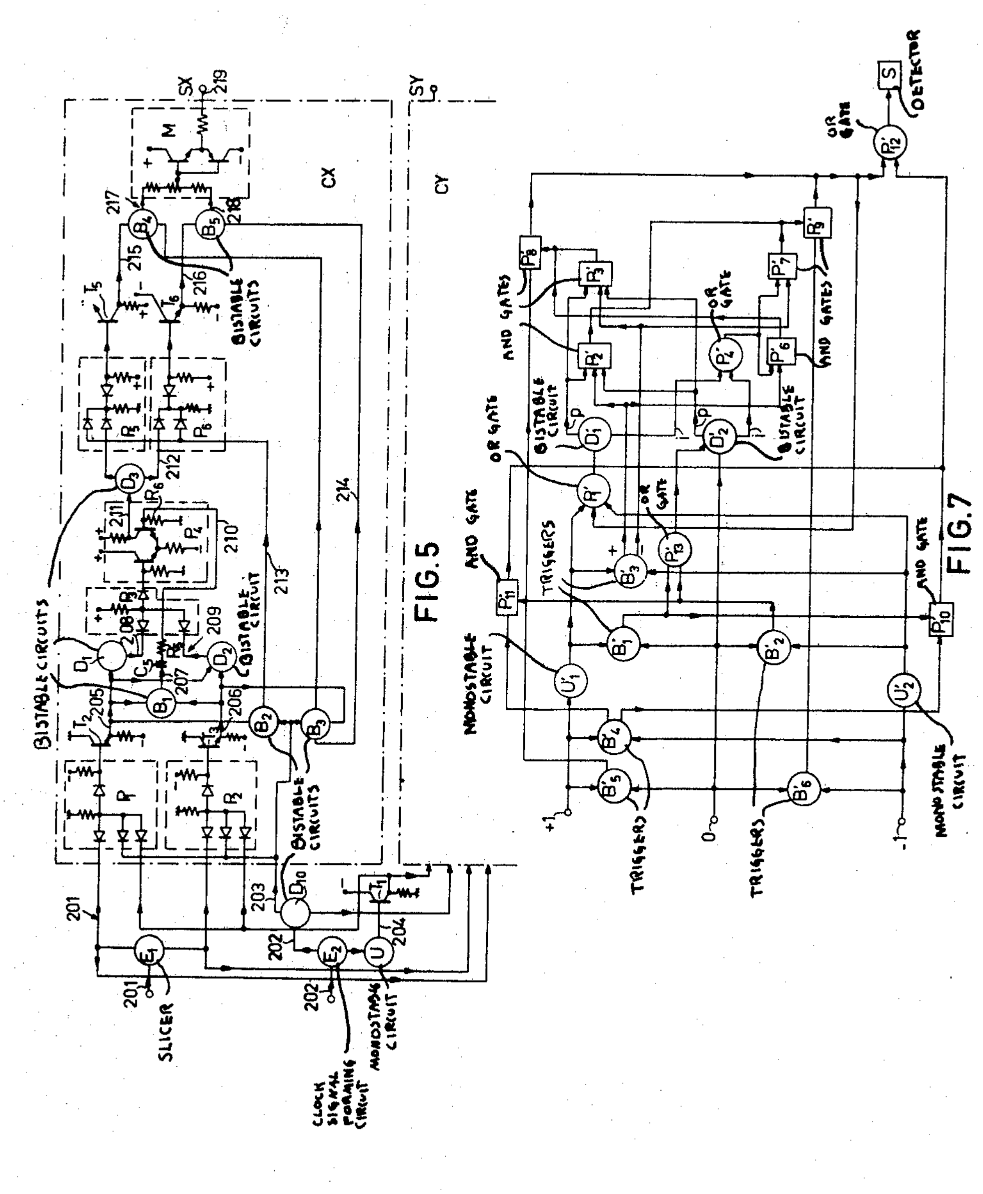
FIG. 7 shows the diagram of an error detector at the reception of signals converted according to the invention.

FIG. 5 shows slightly more in detail a variant of the aforesaid embodiment. For the transmission of a bivalent modulation this variant allows the use of two transmitting channels along a long-distance line. The modulation to be transmitted is divided into two partial modulations of half the rate, to be recombined at the receiver end as is described in French patent specification 1,330,777 in the name of the applicant. The diagram, given in detail only for one of the channels, termed here X, is distinguished from the former by the interposition of a demultiplier for the clock signals (formation of "half-clock signals") and by a modification of the gates P1 and P2 of each channel to form a divide-by-two circuit.

Four possibilities provided by this diagram are of special interest:

(1) formation of the differentiation circuit for the clock signals by a monovibrator U instead of a capacitor, permitting diode gates P1 and P2 to be controlled with direct current;

(2) use of the leading and trailing edges of the pulses of this monovibrator so that the modulation can be recovered in the trivalent form with half the rate, the delay being equal to not more than T.

(3 Use of pnp- and npn-transistors according to the polarity of the trigger or demultiplier control-pulses in order to simplify the diagram;

(4) for the formation of the trivalent output modulation the use of the sum of two voltages of opposite polarities and of triggers comprising pnp-transistors and npn-transistors respectively. This permits of producing the zero voltage by mixing two signals from saturated transistors so that any derivation from this zero voltage is avoided.

Figure 6:
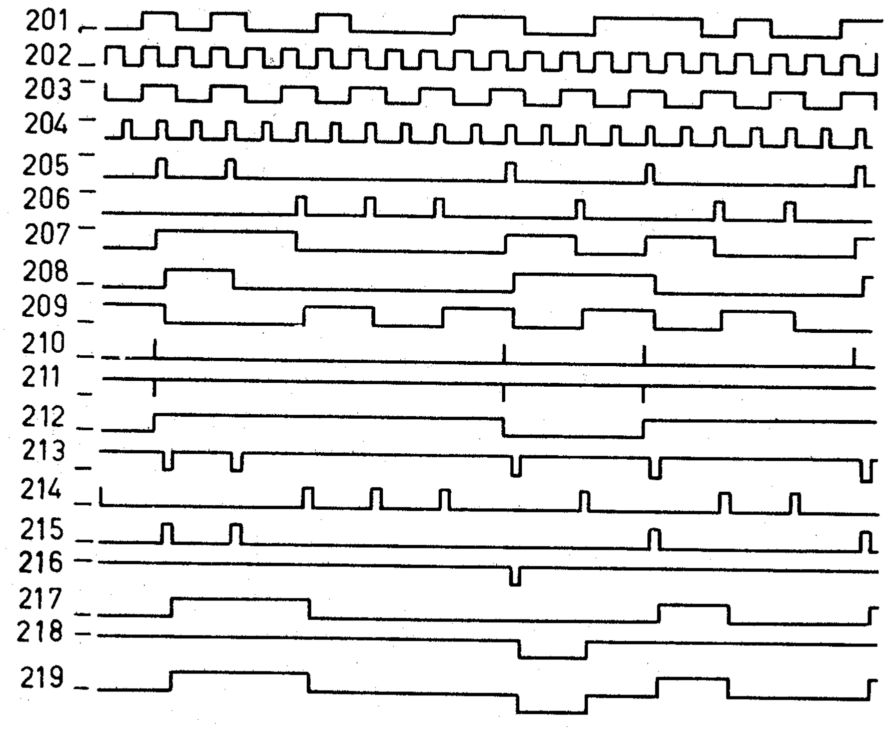

FIG. 6 illustrates the course of the signals at various points of FIG. 5. The reference marks of these figures are the same as those of the preceding embodiment.

The operation is as follows: The initial bivalent modulation 201, identical with the signals 4 and 101, of a rate $1/T$ and the clock signal 202, identical with the signal 102, are applied to the conductors indicated. The modulation, previously reduced to fixed standards by the slicer E1, is transformed at the input of the channel X into two partial modulations of a rate $1/2T$ (205 and 206) by "addition" in the diode gates "AND" P1 and P2 of the input bivalent modulation, of the half clock signal 203 obtained by forming the clock signal at E2 and dividing it by two on D10, and of the clock signal differentiated by the monovibrator U, the output of which is provided with an emitter-follower transistor T1 (signal 204). The output circuits of the gates P1 and P2 include transistors T2 and T3, connected as emitter-followers. The positive leading edges of the signals 205 and 206 are applied to the trigger B1 comprising pnp-transistors, which produce a modulation 207 of half the rate with a delay $T/2$ with respect to the input modulation 201. The positive trailing edges of the signals 205 and 206 are applied to the demultipliers D1 and D2 respectively, comprising npn-transistors which provide by their output signals 208 and 209 respectively of the order (modulo 2) of the 1-elements and the length (modulo 2) of the groups of 0-elements (the even-numbered digits are represented by a positive polarity and the odd-numbered digits are represented by a polarity zero).

It will be apparent that the demultiplier D2 is reset to zero by the pulses 205, so that its output voltage represents the length modulo 2 of the last group of 0-elements. These signals are added in the Or diode gate P3. The sum at the output of the gate P3 is, in general, not zero and it releases the And-gate P4 for the positive pulses 210 obtained by differentiation in a capacitative circuit C5 and a resistor $R5+R6$ from the modulation 207. The gate P4 forms negative pulses 211 which are applied to the demultiplier D3 comprising npn-transistors. B1, D1, D2, P3, P4, and D3 form the calculating apparatus, which determines the polarity of the 1-elements of the trivalent output modulation (a positive signal 212 corresponds with a positive polarity of the 1-elements).

The orders of the calculating apparatus are executed by the and-gates P6 and P5, controlled on the one hand by the signal 212 and the complement thereof and on the other hand by the negative pulses 213 from B2, the leading edge of which coincides with the negative edges of the pulses 205 and the trailing edge of which coincides with the negative edges of the signals 203 of half clock pulse frequency. The latter edge serves to control, after return from the transistor T5, (signal 215) the trigger B4 comprising npn-transistors for the signals from P5 and without return through the transistor T6, connected as an emitter follower, (signal 216) the trigger B5 comprising pnp-transistors for the signals from P6. The trigger B3 furnishes starting from the pulses 206 zero resetting pulses for B5 (trailing edge of signal 214) and B4 (trailing edge of a signal opposite to signal 214). The edges of the signals 217 and 218 from B4 and B5, applied to the mixing stage M are thus displaced by a duration T with respect to the corresponding edges of the incoming modulation. The signal 219 from the mixer M appears at the output SX of a code circuit CX, corresponding to the channel X. The code circuit CY corresponding to the other channel Y is similar to the code circuit CX and is not described in detail.

In a variant of the diagram of FIG. 5 the demultiplier D2 is reset to zero not by the signal 205 but by the output signal of the demultiplier D1, having a polarity opposed to that of the signal 208. This demultiplier is therefore not set correctly to zero after an isloated 1-element (modulo 2), but this is not important, since in this case the output signal of the demultiplier D1 ensures the correct operation of the gate P4.

The signals from converters like those shown in FIGS. 3 or 5 are then filtered by a filter satisfying the Nyquist conditions for the frequency $1/2T$ and are applied to the transmitting circuits.

At the receiver end, if no error detection is desired, the receiver capable of reproducing the trivalent modulation as in the aforesaid patent specifications is capable of reproducing the trivalent modulation according to the invention without any modification, since in any case there exists between the modulations the correspondence $\pm 1$ gives 1 and 0 gives 0.

If it is desired to use the possibilities provided by coding to detect the transmission errors, it is necessary to verify whether the trivalent modulation reproduced by the receiver has a structure corresponding to the code of the present invention, that is to say:

(1) whether an element $+1$ and an element $-1$ are not contiguous and, if this is the case, (2) whether a group of $+1$-elements, followed by an odd number of 0-elements, is followed by a group of $-1$-elements and conversely;

(3) whether a group of $+1$-elements, followed by an even number of 0-elements, is followed by a group of $+1$-elements or $-1$-elements and conversely according as the order of the last element of said group is 0 or 1 (modulo 2).

By way of specific example FIG. 7 shows the basic diagram of an error detector at the receiver end, which responds to the assembly of the preceding conditions. For the sake of clarity, the restoration of the signals of only one of the transmission channels is described (the channel X for example); only the associated error-detecting system is shown.

It will be seen from this diagram that the error signal is formed by the pulses +1 or −1 themselves, which reach the error detectors S through gates which cut them off when the signal corresponds to the desired conditions. These pulses are furnished, subsequent to the separation of the transmission channels and demodulation, by "square-wave" comparison devices, the outputs of which are connected to the terminals designated +1, 0 and −1 in this figure. The reception of a signal +1, 0 or −1 produces a pulse at the corresponding terminal.

In FIG. 7 B'1 and B'2 designate triggers in the energized state, so that they furnish a continuous signal at the output terminals when they receive a pulse (element ±1) at one of the input terminals, and until they are reset to the rest state by a pulse (element 0) at the other input terminal. The trigger B'3 furnishes a continuous signal at one or the other of its output terminals, designated + and − according as it has received the last pulse at one or at the other of its input terminals, connected to the terminals +1 and −1 respectively. The trigger B'4 furnishes a pulse at one or at the other of its output terminals, when it changes over from one to the other of its stable states or conversely, The triggers B'5 and B'6 furnish a pulse, when they change over from one to the other of their stable states. U'1 and U'2 are monovibrators, which are intended for delaying the positioning of the triggers B'1, B'2, B'3 with respect to B'5, B'6, B'4 so that the compatibility of two consecutive positionings can be stated. P'1, P'4, P'12 and P'13 are Or-gates, whereas P'2, P'3, P'6, P'7, P'8, P'9, P'10, P'11 are and-gates. D'1 and D'2 are bistable demultipliers, changing their states at each of the incoming pulses, they indicate modulo 2 the order of the last element received and the length of the group of 0-elements during the reception. The demultiplier D'2 is provided with a special input for being reset to zero through the gate P'13 by the elements ±1.

For the explanation of the operation first the case will be described in which a group of elements +1 is received. At this instant the trigger B'1 retains the passage of this group and maintains the gate P'10 open as long as no zero element is received.

If a group of −1-elements is then received without intermediate 0's, the trigger B'4, which has also been set by the elements, +1 changes its state and furnishes a pulse at the input of the gate P'10, which passes it towards the detector S through the gate P'12 (an intermediate 0 would have closed the gate P'10 and rendered this transfer impossible).

If a new group of +1-elements is received after a given number of 0-elements, a pulse is furnished by the trigger B'5 at the input of the gate P'8. If the number of 0-elements is odd or if the last element of the preceding group of +1 elements is odd-numbered, this gate is opened.

At least one of the demultipliers D'1 or D'2 is placed in the odd-numbered state (signal *i* at the output) by pulses +1 (through the gate P'1) or 0 preceding these elements. Thus the gate P'4 is placed in its singular state. On the other hand the trigger B'3, being set in the + state, has set in co-operation with P'4, the gate P'6 in its singular state, so that P'8 opens. The pulse furnished by B'5 is transferred through the detector via P'12 and is returned to the gate P'1, so that the demultiplier D'1 changes its state. This demultiplier is thus reset to the correct phase, since irrespective of the cause of the error, it has produced a premature variation of the parity to be observed for the elements 1.

If a group of −1-elements is received after a group of 0-elements, the trigger B'6, which has been set by the 0-elements, changes its state and furnishes a pulse at the input of the gate P'9. If the number of these 0-elements and the order of the last 1-element are even-numbered, this gate is opened. The demultiplires D'1 and D'2 are in the even-numbered state (signal at the output *p*), and the trigger B'3 is still in the + state so that the output of the gate P'2 is in its singular state, producing the opening of the gate P'9. The pulse from P'9 operates as before.

If instead of a group of +1-elements there is received a group of −1-elements, the foregoing description may be repeated by exchanging B'1 and B'2, P'10 and P'11, P'2 and P'3, P'6 and P'7, P'8 and P'9.

The error signals from P'12 may produce, apart from an alarm, the transmission of an order to repeat to the transmitting device.

A partial error detection, signalling only the non-contiguity of the elements +1 and −1, is easily obtained by maintaining in the diagram shown only the elements B'1, B'2, B'4, U'1, U'2, P'10 and P'11.

What is claimed is:

1. An apparatus for converting a binary signal having groups of sequential elements of one of two states 0 and 1 into a trivalent signal having groups of sequential elements of one of three states 0, +1 and −1, comprising means for converting the binary groups of state 0 to trivalent groups of state 0, means for converting binary groups of sequential elements of state 1 into sequential trinary groups normally alternating between groups of elements of state 1 and groups of elements of state −1, and means for preventing said alternation when the number of elements of an intervening binary group of state 0 is even and the last element of the preceding binary group of state 1 is of a selected parity.

2. An apparatus as claimed in claim 1 wherein said selected parity is odd.

3. An apparatus as claimed in claim 1 wherein said selected parity is even.

4. A device as claimed in claim 1 comprising a first demultiplier means including two transmission paths and a bistable circuit changing its state at each incoming pulse for receiving pulses corresponding to the groups of 1-elements to be converted and opening either one or the other of its states in accordance with the two transmission paths, which paths conduct opposite polarities to said groups, a second demultiplier means for receiving a pulse of an element 0 and being reset to zero at any group of 1-elements, a third demultiplier means for receiving a pulse of an element 1, an Or-gate controlled by said second and third demultipliers and an And-gate controlled by said Or-gate and controlling at the first demultiplier the reception of said pulses corresponding to the groups of 1-elements.

5. A converter as claimed in claim 4, further comprising a monovibrator for receiving the synchronizing signals for the converted information and supplying square-wave pulses of a duration shorter than that of an element of said information, said second and third demultipliers being controlled solely by the trailing edges of said square-wave pulses, said pulses corresponding to the groups of 1-elements to be converted coincide with the leading edges of said square-wave pulses.

6. A converter as claimed in claim 4, further comprising two symmetrical transistorized triggers of the pnp-type and of the npn-type respectively, and having inputs coupled to said first and second demultipliers and said bistable element respectively, said inputs being fed by voltages of opposite polarities and symmetrically controlled by pulses appearing via the first input of each of these two triggers, at the beginning of the signals of state 1 to be transmitted, which are positive for one of these triggers and negative for the other, and at the second input of each of these triggers at the beginning of the signals of state 0 to be transmitted, the complete signal to be transmitted resulting from the mixture of the output signals of these two triggers.

7. An apparatus as claimed in claim 1 further comprising three conductors to which are applied pulses representing the positive elements 1 (+1), 0 negative elements 1 (−1) coming in, at least three triggers having two inputs, connected pairwise between the conductors, a first Or-gate receiving the elements +1 and −1 and controlling a first demultiplier, a second demultiplier receiving the pulses 0 and being reset to its rest state by the pulses +1 and −1, a second Or-gate the two inputs of which are connected to the outputs of the said two demultipliers corresponding to an odd number of incoming pulses and an assembly of And-gates coupled to said demultipliers controlling the transmission to the output of the detector of signals from the said members.

8. An apparatus as claimed in claim 7, further comprising a third Or-gate and wherein said first Or-gate comprises a third input connected to the inputs of said third Or-gate, said third Or-gate having applied the output pulses of the detector, the transmission of which depends upon the state of said demultipliers, and the output of said gate forming the output of the detector.

References Cited

UNITED STATES PATENTS 3,337,864 8/1967 Lender .......... 340—146.1 X

MALCOLM A. MORRISON, Primary Examiner

R. S. DILDINE, Jr., Assistant Examiner

U.S. Cl. X.R.

340—347

PO-1050
(5/69)

UNITED STATES PATENT OFFICE
CERTIFICATE OF CORRECTION

Patent No. 3,505,644 Dated April 7, 1970

Inventor(s) PIERRE L.V.BREANT ET AL

It is certified that error appears in the above-identified patent and that said Letters Patent are hereby corrected as shown below:

col. 3, line 68, cancel "practically";

col. 7, line 30, after "conversely" cancel "," and insert a period (.);

Signed and sealed this 8th day of October 1974.

(SEAL)
Attest:

McCOY M. GIBSON JR.
Attesting Officer

C. MARSHALL DANN
Commissioner of Patents